United States Patent [19]

Cassidy

[11] Patent Number: 5,232,730
[45] Date of Patent: Aug. 3, 1993

[54] FOOD INGREDIENT—FAT SUBSTITUTE

[75] Inventor: Richard D. Cassidy, La Porte, Ind.

[73] Assignee: Wixon-Fontarome, Inc., St. Francis, Wis.

[21] Appl. No.: 854,253

[22] Filed: Mar. 20, 1992

[51] Int. Cl.⁵ .................. A23L 1/0532; A23L 1/29
[52] U.S. Cl. .................................... 426/573; 426/602; 426/804
[58] Field of Search ............... 426/602, 575, 603, 613, 426/804, 104

[56] References Cited

U.S. PATENT DOCUMENTS

| | | | |
|---|---|---|---|
| 4,276,320 | 6/1981 | Moirano | 426/575 |
| 4,414,236 | 11/1983 | Moran | 426/575 |
| 4,759,936 | 7/1988 | Best et al. | 426/575 |

*Primary Examiner*—Jeanette Hunter
*Attorney, Agent, or Firm*—Godfrey & Kahn

[57] ABSTRACT

A food ingredient which may be utilized to replace animal fat in processed meats or similar products, and which includes carrageenan; sodium chloride; an electrolyte selected from the group of electrolytes which include calcium or potassium; vegetable oil; and water.

4 Claims, No Drawings

FOOD INGREDIENT—FAT SUBSTITUTE

FIELD OF THE INVENTION

The present invention relates to a food ingredient for replacing animal fat in an edible food product, and more particularly, to a food ingredient which is operable to replace animal fat in a processed meat product, and which further has physical, and flavor characteristics which otherwise simulate animal fat, but which further does not have the adverse health consequences associated with the consumption of animal fat, while simultaneously achieving other laudable benefits.

DESCRIPTION OF THE PRIOR ART

The damaging health consequences of consuming large amounts of animal fat is well documented. Beyond the obvious health risks of a high fat diet which may include obesity, and high blood pressure, health experts have long recognized that high fat diets also carry substantial health risks with respect to the development of coronary heart disease and the related anomaly of stroke.

As Americans have become increasingly health conscious, food manufacturers have endeavored, through the years, to provide an ever-increasing variety of food products which have been modified, in various fashions, to reduce or substantially eliminate the health risks attendant to the ingestion of ingredients such as animal fat, various chemical additives, and the like. For example, there have been numerous ingredients introduced in the last decade and which operate as a replacement for fat in various food products. For example, food processors have utilized modified food starch, pectin, gelatin, maltodextrin, soy protein, milk protein, hydrolyzed beef plasma, hydrolyzed oat flour, and carrageenan, on some occasions. In most instances, these same ingredients were individually designed and utilized to replace fat in very specific food products, such as, for example, baked goods, ice cream, mayonnaise, and similar products.

While these substances or ingredients, noted above, have operated with some degree of success when utilized in combination with the specific food products for which they were individually designed, they have, however, had other shortcomings which have detracted from their usefulness. For example, some food processors have attempted to utilize the above-identified substances in processed meat products. In this regard, hydrolyzed beef plasma has been utilized, heretofore, as an animal fat replacement ingredient. Further, some of the other substances noted above have been utilized in processed meat products, however, they have not achieved satisfactory results inasmuch as they are merely water binders which operate, when hydrated, to fill the volume left behind when the fat is removed from the meat formula. Additionally, these same substances do not have physical characteristics which are similar to fat, that is, they do not have the same color, flavor, texture, or mouth feel, which would normally be attendant to a product which had the same amount of animal fat.

Other attempts to provide an animal fat replacement ingredient have resulted in other shortcomings. For example, some of the proposed fat replacement products have a high caloric content, or further have other constituent ingredients, such as preservatives, which have detracted from the usefulness of these same products.

Therefore, it has long been known that it would be desirable to have a food ingredient for replacing animal fat in various food products, including processed meats, and which is operable to simulate the characteristics of animal fat, that is, it has substantially the same color, flavor, texture, mouth feel and melting point of animal fat, but further has few of the deleterious health consequences which would normally be attendant to ingesting the same amount of animal fat, while serving a variety of other useful functions.

OBJECTS AND SUMMARY OF THE INVENTION

Therefore, it is an object of the present invention to provide an improved food ingredient which is operable to replace animal fat in processed meats, or the like.

Another object of the present invention is to provide such a food ingredient which has substantially the same color, flavor, texture, mouth-feel, and melting point characteristics of animal fat but further contains little or no saturated fat, and no cholesterol, and about 95% less calories when compared with animal fat such as beef or pork.

Another object of the present invention is to provide a food ingredient for replacing animal fat in an edible food product which comprises:
  about 1% to about 5%, by weight, of carrageenan;
  0 to about 5%, by weight, of sodium chloride;
  0 to about 5%, by weight, of an electrolyte which is selected from the group of electrolytes which include: calcium, or potassium electrolytes;
  0 to about 20%, by weight, of a vegetable oil; and
  about 75% to about 95%, by weight, of water.

Another object of the present invention is to provide a food ingredient for replacing animal fat in an edible food product, and wherein the melting point of the food ingredient is substantially identical to that of animal fat.

Another object of the present invention is to provide a food ingredient, and wherein 100 grams of the food ingredient includes about 3 grams of fat and about 41 calories.

Another object of the present invention is to provide a food ingredient which may optionally contain a protein phase which includes calcium caseinate, sodium caseinate, soy isolate, mustard protein, or gelatin.

Another object of the present invention is to provide a food ingredient which is economical to manufacture, is employed in the same fashion as conventional animal fat, and further is fully effective in simulating substantially all the characteristics of animal fat when incorporated into a processed meat product.

Further objects and advantages of the present invention are to provide an improved food ingredient for an edible food product for the purposes described, and which is dependable, economical, healthy, and fully effective in accomplishing its intended purposes.

DESCRIPTION OF THE PREFERRED EMBODIMENT

A food ingredient which is operable to replace animal fat in a processed meat product and which has physical characteristics which are substantially identical relative to the color, flavor, rheology, mouth-feel, and melting point of animal fat includes:
  about 1% to about 5%, by weight, of carrageenan;
  0 o about 5%, by weight, of sodium chloride;

0 to about 5%, by weight, of an electrolyte which is selected from the group of electrolytes which include calcium, or potassium electrolytes;

0 to about 20%, by weight, of a vegetable oil; and about 75% to about 95%, by weight, of water.

In addition to the foregoing, the above-identified food ingredient may additionally include an optional protein phase which may include, for example, calcium caseinate, sodium caseinate, soy isolate, mustard protein, and gelatin, for example. Additionally, the same food ingredient may be flavored to further enhance the meat product which is receiving same. For example, flavoring may be added to provide the food ingredient with a butter, grill, beef, pork, or chicken flavor.

As should be understood, carrageenan is an extract from seaweed, and those skilled in the art will readily understand the process and procedures for the production of same. Therefore, for purposes of brevity, they are not discussed in further detail herein. As should be understood, carrageenan (3,6 -anhydro-D-galactan) is a sulfer phycocolloid, and cell-wall polysaccharide mucilage found in Red Algae such as Chondrus Crispus and several other species. In most instances, carrageenan is extracted from a seaweed called Carragen or Irish Moss. Carrageenan is a mixture of polysaccharide fractions. These include the lambda fraction, which is cold water soluble, and which contains D-galactose and about 35% esterified sulfate. The lambda fraction does not gel. In contrast, the kappa fraction contains D-galactose and 3,6-anhydro-D-galactose in a ration of about 1.4 to 1, and 25% esterified sulfate. The kappa fraction does not gel without the addition of a solute, such as the electrolytes which include potassium, or calcium, and the properties of the gel depend on the amount and nature of the solute. Finally, an iota fraction of carrageenan is recognized, and it has characteristics which are somewhat intermediate the two other fractions noted above.

Food processors may purchase kappa, lambda, and iota varieties of carrageenan from various manufacturers which include, The Carrageenan Marketing Corporation, Hercules Chemical Company, FMC, Sanofi, and The Mitsubishi Chemical Company. In this regard, the kappa variety of carrageenan is, as a general matter, extracted from seaweed which is harvested in subtropical areas such as off the coast of the Philippines, or Indonesia. Further, the iota variety tends to be extracted from seaweed varieties which are harvested in much colder water such as for example, off the coast of Scotland or Ireland. Finally, the lambda variety tends to be harvested from seaweed harvested in waters which have temperatures which are somewhat between the two extremes noted above. Heretofore, the iota variety of carrageenan has been added to food products, such as apple juice, for purposes of making it pulpy, or in milk shakes to increase the viscosity of the shake while simultaneously maintaining its flowability. Further, this same variety of carrageenan may also be utilized in such food products as ice cream. As should be understood, the kappa variety of carrageenan appears to be ideal for meat products inasmuch as, at higher temperatures, it has the propensity to gel and lock in water in a desirable fashion. While all the varieties of carrageenan, discussed above, may operate with some degree of success in the present formulation, the inventor has discovered that the kappa variety produces much more successful results than the other two varieties when utilized specifically with processed meats.

In the preferred formulation, noted above, the invention includes 0 to about 5%, by weight, of sodium chloride. In this regard, it should be understood that this sodium chloride is usually the all-purpose variety of salt, that is, salt which may be purchased from any number of commercial manufacturers such as, for example, Diamond Crystal, Morton, and Cargill, to name but a few. Additionally, the preferred formulation has 0 to about 5%, by weight, of a solute or electrolyte which is selected from the group of solutes or electrolytes which include calcium or potassium ions. In this regard, it is long been known that the addition of solutes containing potassium or calcium to carrageenan causes this same material to crosslink thereby forming a very hard clear gel. In addition, the present formulation includes 0 to about 20%, by weight, of a vegetable oil, and wherein the vegetable oil may include a vegetable oil which is selected from the group of vegetable oils which include canola, olive, soybean, cottonseed, coconut, and peanut oils, to name but a few. Such oils may be commercially purchased from such manufacturers as Vanderbergh and Wesson, to name only one of a multitude of companies. Finally, the preferred formulation has about 75% to about,95%, by weight, of water.

The present formulation, noted above, may, in addition, have optional ingredients. For example, the present food ingredient may have an optional protein phase which may include other substances, such as, calcium caseinate, sodium caseinate, soy isolate, mustard protein, and gelatin, to name but a few. Those skilled in the art will recognize that additional substances, other than those noted above, may be added in the optional protein phase to provide additional beneficial characteristics. These substances noted above, may be purchased from any number of manufacturers such as DMV-Campina; ADM; and Hormel, to name but a few. Moreover, flavoring extracts may be purchased, and which may be added to the present formulation to further enhance the inventions performance characteristics. For example, various flavorings may be purchased from Wixon Industries, Inc. of St. Francis, Wis., under the trade designations WO2949, and WO2890, for example and which produce assorted flavors such as butter, grill, beef, pork, or chicken flavor. These flavorings, of course, will further enhance the flavor of the final processed meat product. Additionally, it should be understood that in certain instances, the flavorings may contain the electrolytes which are noted above. Alternatively, the electrolytes may be supplied in the optional protein phase.

The food ingredient of the present invention is further illustrated by the example which is set forth below. The food ingredient of the present invention is compounded in the following fashion; a dry blend of kappa carrageenan is combined utilizing conventional blending techniques with salt, flavoring, and a protein phase in the following proportions:

about 3%, by weight, of a kappa variety carrageenan;

about 3%, by weight, of sodium chloride;

about 3%, by weight, of a vegetable oil;

about 0.8%, by weight, of a flavoring mixture which includes, a flavoring mixture secured from the Cumberland Packing Company of Wisconsin under the trade designation "Butter Buds" high concentrate, no color, and which produces, a buttery taste; and about 0.2%, by weight, of calcium caseinate.

In the present formulation, the calcium caseinate provides the electrolyte for the present formulation thereby causing the carrageenan to form into a gel as discussed earlier.

Following the dry blending of the contents, noted above, these same contents are then charged directly into a jacketed steam kettle which has had water placed therein. The water constitutes 90%, by weight, of the final composition. The water has been heated to a temperature range of approximately 105° to 120° F. Upon the addition of the carrageenan, and other components, a high sheer mixer/homogenizer is actuated and which is utilized to form a homogeneous blend of the components noted above. Following the addition of the dr blend and the complete dissolving of same, and further before the solution becomes too viscous, the vegetable oil component is added. The composition is then emulsified completely. Following this step, the composition is heated to a temperature of over 180° to pasteurize same. The contents of the steam kettle is thereafter emptied, and the food ingredient is packaged in plastic pails or other suitable containers. The food ingredient is subsequently stored in suitable refrigeration facilities.

To test the effectiveness of the new food ingredient, the food ingredient was combined. with lean ground beef, in amounts, by weight, of 5% to 25%. The samples were then visually inspected to determine if they presented an unusual appearance. None was noted. Further, these samples were cooked and sampled to determine if they presented the mouth-feel, and rheology expected of a food sample which had a high fat content. Those individuals who tasted the samples agreed that the flavor, mouth-feel, and rheology was similar to a 25% hamburger.

In the chart which is set forth, below, the nutritional characteristics of the present food ingredient is compared and contrasted with fats which have been extracted from beef, chicken, lamb, pork, turkey, and further is compared against other common substances such as butter and margarine.

| Type of Fat | Total Fat (gm/100 gm) | Saturated Fat (gm/100 gm) | Cholesterol (mg/100 gm) | Calories per 100 gm |
|---|---|---|---|---|
| INVENTION | 3 | 0 | 0 | 41 |
| BEEF | 100 | 48 | 75 | 900 |
| BUTTER | 81 | 45 | 250 | 787 |
| CHICKEN | 100 | 26 | 65 | 900 |
| LAMB | 100 | 50 | 75 | 900 |
| MARGARINE | 81 | 21 | 0 | 717 |
| PORK | 100 | 40 | 70 | 900 |
| TURKEY | 100 | 27 | 65 | 900 |

NUTRITIONAL COMPARISONS OF THE INVENTION TO OTHER AVAILABLE FATS

As will be clear following a review of the information which is summarized, above, it is evident that the present invention has significant health advantages when utilized as a substitute for the fats or the other food products, such as butter or margarine, noted above. For example, the present food ingredient has a total, per 100 grams, of approximately 3 grams of fat; no saturated fat; no cholesterol and further produces approximately 41 calories. This is in contrast to beef fat, for example, which has approximately 100 grams of fat; 48 grams of saturated fat; 75 milligrams of cholesterol and approximately 900 calories. Further, and when compared with the fats noted above, the melting point of same was approximately equal to the animal fats set forth above, that is, the present food ingredient has a melting point, depending upon the concentration of carrageenan, of about 105° F. to about 140° F. This, of course, is closely similar to the melting point of all the animal fats noted above. Additionally, the visual appearance as well as the rheology of the food ingredient are substantially identical to animal fat. The present invention was tested to determine its relative shelf life and it has been determined that the present invention has a shelf life of approximately 4 weeks when held in conventional refrigeration at temperatures of approximately 30° to 40° F. and approximately 6 months when held in a frozen state.

Therefore, it will be seen that the food ingredient of the present invention provides a means by which meat processors can safely, and effectively remove animal fat from individual food products while simultaneously preserving the flavor and taste which would normally be attendant to having a food product which had a higher animal fat content, but further provide a product which has a reduced caloric content, little or no saturated fats, and no cholesterol.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent of the United States is:

1. A food ingredient for replacing animal fat in a processed meat product comprising:
   about 3%, by weight, of a kappa variety carrageenan;
   about 3%, by weight, of sodium chloride;
   about 3%, by weight, of a vegetable oil;
   about 1%, by weight, of an electrolyte selected from the group of electrolytes which include calcium or potassium; and
   about 90%, by weight, of water.

2. A food ingredient as claimed in claim 1, and melting point of the food ingredient i about 105° F. to about 140° F.

3. A food ingredient as claimed in claim 2, and wherein the food ingredient has about 3 grams of fat per 100 grams, and produces about 41 calories per 100 grams.

4. A food ingredient as claimed in claim 3, and the food ingredient has no cholesterol and little or no saturated fats.

* * * * *